United States Patent
Lee et al.

(10) Patent No.: US 6,525,497 B2
(45) Date of Patent: Feb. 25, 2003

(54) PHASE DISTORTION COMPENSATING APPARATUS AND METHOD FOR REDUCING TORQUE RIPPLE IN 3-PHASE MOTOR

(75) Inventors: Dong Myung Lee, Seoul (KR); Jae Yoon Oh, Seoul (KR); Dal Ho Cheong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/813,149

(22) Filed: Mar. 21, 2001

(65) Prior Publication Data

US 2002/0053891 A1 May 9, 2002

(30) Foreign Application Priority Data

May 22, 2000 (KR) .............................. 00-27417
May 18, 2000 (KR) .............................. 00-26759

(51) Int. Cl.$^7$ ................................................ H02P 7/00
(52) U.S. Cl. ...................... 318/432; 319/434; 319/802
(58) Field of Search ................. 318/716–721, 318/724, 771, 798–803, 432, 434

(56) References Cited

U.S. PATENT DOCUMENTS

| | | | | |
|---|---|---|---|---|
| 4,511,827 A | * | 4/1985 | Morinaga et al. | 318/721 |
| 5,473,240 A | * | 12/1995 | Moreira | 318/801 |
| 6,153,993 A | * | 11/2000 | Oomura et al. | 318/434 |
| 6,367,273 B2 | * | 4/2002 | Takagi et al. | 318/802 |

FOREIGN PATENT DOCUMENTS

| | | |
|---|---|---|
| JP | 11-089239 | 3/1999 |
| JP | 11-136994 | 5/1999 |

* cited by examiner

Primary Examiner—Marlon T. Fletcher
(74) Attorney, Agent, or Firm—Birch, Stewart, Kolasch & Birch, LLP

(57) ABSTRACT

Disclosed are a phase distortion compensating apparatus and method for reducing a torque ripple in a 3-phase motor using four switching elements, which are capable of adjusting respective switching times of phase voltages, to be supplied to the 3-phase motor by an inverter including the switching elements, based on a voltage difference between upper and lower DC link capacitors respectively adapted to supply voltages to the inverter, thereby reducing a torque ripple generated in the motor. The apparatus includes a rectifier unit, upper and lower DC link capacitors connected in parallel to the rectifier unit, each of the capacitors serving to conduct charge and discharge operations for a DC voltage outputted from the rectifier unit, an inverter connected in parallel to the capacitors and adapted to generate a 3-phase voltage adapted to rotate the motor, based on voltages respectively discharged from the capacitors along with a switching signal, and a voltage command generator for calculating compensation components for respective switching operations of switching elements of A and B phases included in the inverter, based on a voltage difference between the capacitors, a difference between an actual motor speed and a command speed, and a rotor position, and providing respective switching times including the calculated compensation components, thereby controlling a rotating speed of the motor.

11 Claims, 10 Drawing Sheets

FIG. 4
CONVENTIONAL ART
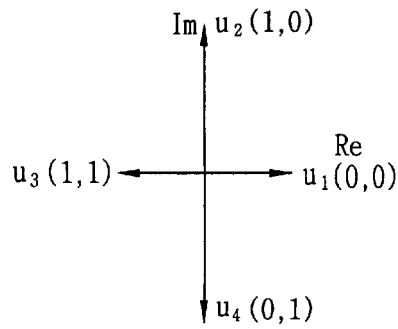
FIG. 5
CONVENTIONAL ART
| SWITCHING TIME | APPLICATION VOLTAGE | S1 | S2 | Re | Im |
|---|---|---|---|---|---|
| t1 | $u_1$ | 0 | 0 | $V_2$ | 0 |
| t2 | $u_4$ | 0 | 1 | $\frac{1}{2}(V_2 - V_1)$ | $-\frac{\sqrt{3}}{2}(V_1 + V_2)$ |
| t3 | $u_2$ | 1 | 0 | $\frac{1}{2}(V_2 - V_1)$ | $\frac{\sqrt{3}}{2}(V_1 + V_2)$ |
| t4 | $u_3$ | 1 | 1 | $-V_1$ | 0 |
FIG. 6
CONVENTIONAL ART
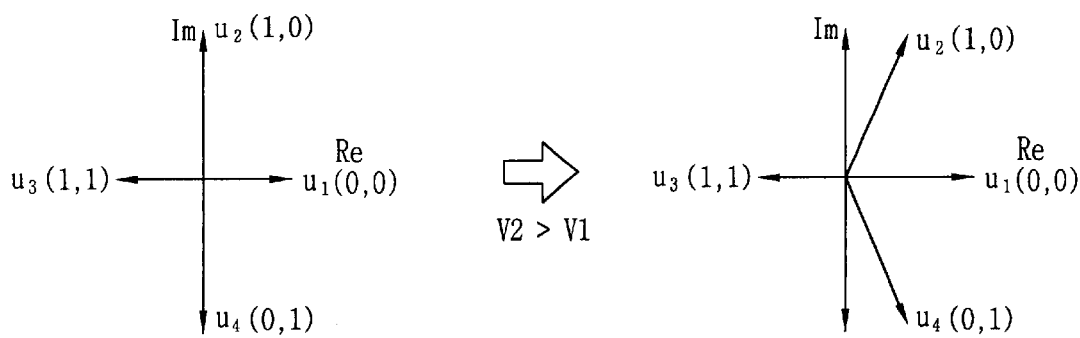

$V2 > V1$

| S1 | S2 | $i_{dc1}$ | $i_{dc2}$ |
|----|----|-----------|-----------|
| 0 | 0 | 0 | $i_{cs}$ |
| 0 | 1 | $i_{bs}$ | $-i_{as}$ |
| 1 | 0 | $i_{as}$ | $-i_{bs}$ |
| 1 | 1 | $-i_{cs}$ | 0 |

PHASE DISTORTION COMPENSATING APPARATUS AND METHOD FOR REDUCING TORQUE RIPPLE IN 3-PHASE MOTOR

BACKGROUND OF THE INVENTION

1. Field of the Invention

The present invention relates to an apparatus and method for controlling the speed of a 3-phase motor using four switching elements, and more particularly to a phase distortion compensating apparatus and method for reducing a torque ripple in a 3-phase motor using four switching elements, which are capable of directly or indirectly detecting a voltage difference between upper and lower DC link capacitors connected to respective switch legs of an inverter including the switching elements, and adjusting respective switching times of phase voltages, based on the detected voltage difference to reduce a torque ripple generated in the 3-phase motor.

2. Description of the Related Art

FIG. 1 is a block diagram illustrating a conventional 3-phase motor controller using four switching elements. As shown in FIG. 1, the 3-phase motor controller includes a pair of DC link capacitors, that is, an upper DC link capacitor 3 and a lower DC link capacitor 4, respectively adapted to receive a DC voltage rectified from an AC voltage, and to store the DC voltage therein. The 3-phase motor controller also includes a B4 inverter 2 configured to turn on or off in response to a switch control signal when the DC voltage from each of the capacitors 3 and 4 is supplied, thereby supplying a 3-phase voltage adapted to rotate a 3-phase motor 1. The 3-phase motor 1 is coupled to respective switch legs of the B4 inverter 2 and coupled to a connection node between the upper and lower DC link capacitors 3 and 4.

Generally, inverters are known which use six switching elements to control a 3-phase motor. However, such inverters are expensive. In order to reduce the costs of such inverters, an inverter has been proposed which uses four switching elements to control a 3-phase motor. An example of such an inverter is the B4 inverter 2 shown in FIG. 1.

Now, the operation of the conventional 3-phase motor controller using four switching elements as mentioned above to control the 3-phase motor will be described.

When an AC voltage is inputted to the 3-phase motor controller, it is rectified by a rectifier means (not shown) which, in turn, generates a DC voltage. This DC voltage is supplied to the upper and lower DC link capacitors 3 and 4 connected in parallel to each other.

As a result, the upper and lower DC link capacitors 3 and 4 conduct charge and discharge operations in an alternating fashion. The alternating charge and discharge operations are controlled in accordance with respective status changes of switching elements composing the B4 inverter 2.

The B4 inverter 2 has four switching status, as shown in FIGS. 3a to 3d. The following description will be made in association with the case in which the 3-phase motor has a Y-connection. In the following description, "1" means an ON state of the upper switching elements in the B4 inverter 2 whereas "0" means an ON state of the lower switching elements. Where only the upper ones of the switching elements respectively corresponding to four voltage vectors of the B4 inverters are switched on, that is, in a status <1, 1>, the voltage V1 charged in the upper DC link capacitor 3 is supplied to the 3-phase motor 1. In this status, no voltage is supplied from the lower DC link capacitor 4 to the 3-phase motor 1.

On the other hand, when only the lower switching elements are switched on, that is, in a status <0, 0>, the voltage V2 charged in the lower DC link capacitor 4 is supplied to the 3-phase motor 1. In this status, no voltage is supplied from the upper DC link capacitor 3 to the 3-phase motor 1.

In statuses <0, 1> and <1, 0>, both the upper and lower DC link capacitors 3 and 4 supply the voltages V1 and V2 to the 3-phase motor 1, respectively.

In order to allow the 3-phase motor 1 to rotate, it is necessary to generate voltages of three phases each exhibiting a phase difference of 120° from one another, Va, Vb and Vc, as shown in FIG. 2.

In order to generate these voltages of three phases, one of three nodes in the B4 inverter 2 respectively corresponding to voltage vectors of three phases applied to the 3-phase motor 1 is connected to the connection node between the upper and lower DC link capacitors 3 and 4, and the remaining two nodes are connected to respective legs between the upper switching elements and the associated lower switching elements.

Also, all 3-phase voltage vectors have not direction, and conclusively "Vu" and "Vw" is only generated, as depicted FIG. 2 when a voltage-Vc is applied to the voltage Va, Vb, Vc in order to generate voltage having the same effect as balanced 3-phase voltages.

The voltage vectors Vu and Vw serve to generate balanced 3-phase voltages along with a voltage of zero-phase. That is, it is possible to obtain 3-phase balanced voltages using four switches.

Two voltage vectors Vu and Vw generated by the B4 inverter 2 have a phase difference of 60° therebetween, as shown in FIG. 2. In the case in which the c-phase of the 3-phase motor is connected to the connection node between the upper and lower DC link capacitors 3 and 4, as mentioned above, the phase of the voltage vector Vu is retarded from the a-phase voltage Va by 30°.

Therefore, where the B4 inverter 2 is controlled using pulse width modulated (PWM) pulses, it is possible to control the 3-phase motor 1 using a switching logic of the B4 inverter 2 expressed by the following Equation 1:

$$V_u = V_{a\_dc} = \left[\frac{1}{2} + \frac{1}{2} \cdot ma \cdot \sin\left(\theta - \frac{\pi}{6}\right)\right] \cdot T_{samp} \quad (1)$$

$$V_w = V_{b\_dc} = \left[\frac{1}{2} + \frac{1}{2} \cdot ma \cdot \sin\left(\theta - \frac{\pi}{2}\right)\right] \cdot T_{samp}$$

where, "θ" represents a rotor position, "ma" represents a modulation rate, and "Tsamp" represents a switching sampling time.

The above Equation 1 is associated with the case in which the c-phase of the 3-phase motor is connected to the connection node between the upper and lower DC link capacitors. Referring to Equation 1, it can be found that the voltages Vw and Vu have a phase difference of 60° therebetween, and the voltage Vu is retarded in phase from the voltage Va by 30°.

In accordance with the above mentioned conventional method, the supply of a voltage to the motor has two statuses, that is, a status, in which the voltage is supplied based on only one of the upper and lower DC link capacitors is used, and a status, in which the voltage is supplied based on both the upper and lower DC link capacitors are used, in accordance with the switching statuses of the switching elements composing the B4 inverter. For this reason, there is a voltage difference between the upper and lower DC link capacitors, so that it is impossible to apply a balanced 3-phase voltage to the 3-phase motor. As a result, a torque ripple occurs. Due to such a torque ripple, it is impossible to achieve a reliable speed control.

SUMMARY OF THE INVENTION

The present invention has been made in view of the above mentioned problems involved in the related art, and an object of the invention is to provide a phase distortion compensating apparatus and method for reducing a torque ripple in a 3-phase motor using four switching elements, which are capable of adjusting respective switching times of phase voltages, to be supplied to the 3-phase motor by an inverter including the switching elements, based on a voltage difference between upper and lower DC link capacitors respectively adapted to supply voltages to the inverter, thereby reducing a torque ripple generated in the 3-phase motor.

Another object of the invention is to provide a phase distortion compensating apparatus and method for reducing a torque ripple in a 3-phase motor using four switching elements, in which a torque ripple generated in the 3-phase motor is reduced, based on a voltage difference between upper and lower DC link capacitors supplied to an inverter including the switching elements and detected using a current flowing through the 3-phase motor.

In accordance with one aspect, the present invention provides a phase distortion compensating apparatus for reducing a torque ripple in a 3-phase motor, comprising: a rectifier unit for rectifying an input AC voltage into a DC voltage; upper and lower DC link capacitors connected in parallel to the rectifier unit, each of the DC link capacitors serving to conduct charge and discharge operations for the DC voltage; an inverter connected in parallel to the capacitors and adapted to generate a 3-phase voltage adapted to rotate the 3-phase motor, based on voltages respectively discharged from the capacitors along with a switching signal; and a voltage command generator for calculating compensation components for respective switching operations of switching elements of A and B phases included in the inverter, based on a voltage difference between the capacitors, a difference between an actual rotating speed of the motor and a command speed, and a rotor position of the motor, and providing respective switching times including the calculated compensation components, thereby controlling a rotating speed of the motor.

In accordance with another aspect, the present invention provides a phase distortion compensating method for reducing a torque ripple in a 3-phase motor, comprising the steps of: (a) calculating respective switching times (Ta and Tb) for upper ones of four switching elements respectively associated with A and B-phase legs in an inverter, based on a voltage command for driving the 3-phase motor; (b) comparing the calculated switching times (Ta and Tb) with each other; (c) calculating on-time t1 of lower switch in the A and B-phase leg switching status from the Ta and Tb and on-time t2 of upper switch in the A and B-phase leg switching status from the Ta and Tb, (d) detecting a current inputted to a connection node between upper and lower DC link capacitors respectively connected to the A and B-phase legs of the inverter after completion of the calculation for the switching times (t1 and t3), and integrating the detected current, thereby deriving a difference between a voltage across the upper DC link capacitor and a voltage across the lower DC link capacitor, (e) calculating respective compensation components (ΔTa and ΔTb) for the switching times (Ta and Tb), based on the derived voltage difference, and (f) producing new switching times (Ta' and Tb') respectively reflecting the calculated compensation components, and supplying the new switching times to the inverter.

BRIEF DESCRIPTION OF THE DRAWINGS

The above objects, and other features and advantages of the present invention will become more apparent after reading of the following detailed description when taken in conjunction with the drawings, in which:

FIG. 4 is a diagram depicting four voltage vectors generated in respective cases of FIGS. 3a to 3d having different switching statuses S1 and S2 using an orthogonal coordinates system;

FIG. 5 is a table describing real number components Re and imaginary number components Im of the four voltages depicted in FIG. 4;

FIG. 6 is a diagram illustrating voltage vectors generated when a voltage V2 is higher than a voltage V1;

DESCRIPTION OF THE PREFERRED EMBODIMENTS

Figure 1:
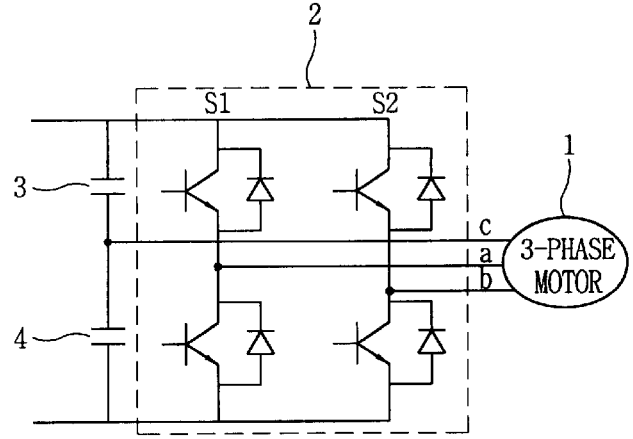
FIG. 1 is a block diagram illustrating a conventional 3-phase motor controller using four switching elements.
Figure 2:
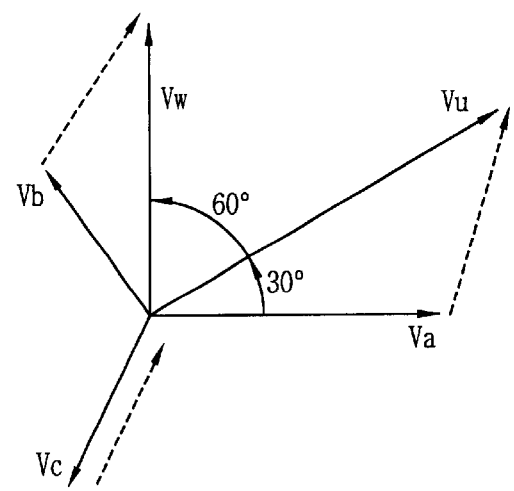
FIG. 2 is a diagram illustrating 3-phase voltage vectors having a phase difference of 120° from one another, along with 2-phase voltage vectors having a phase difference of 60° therebetween.
Figure 12A:
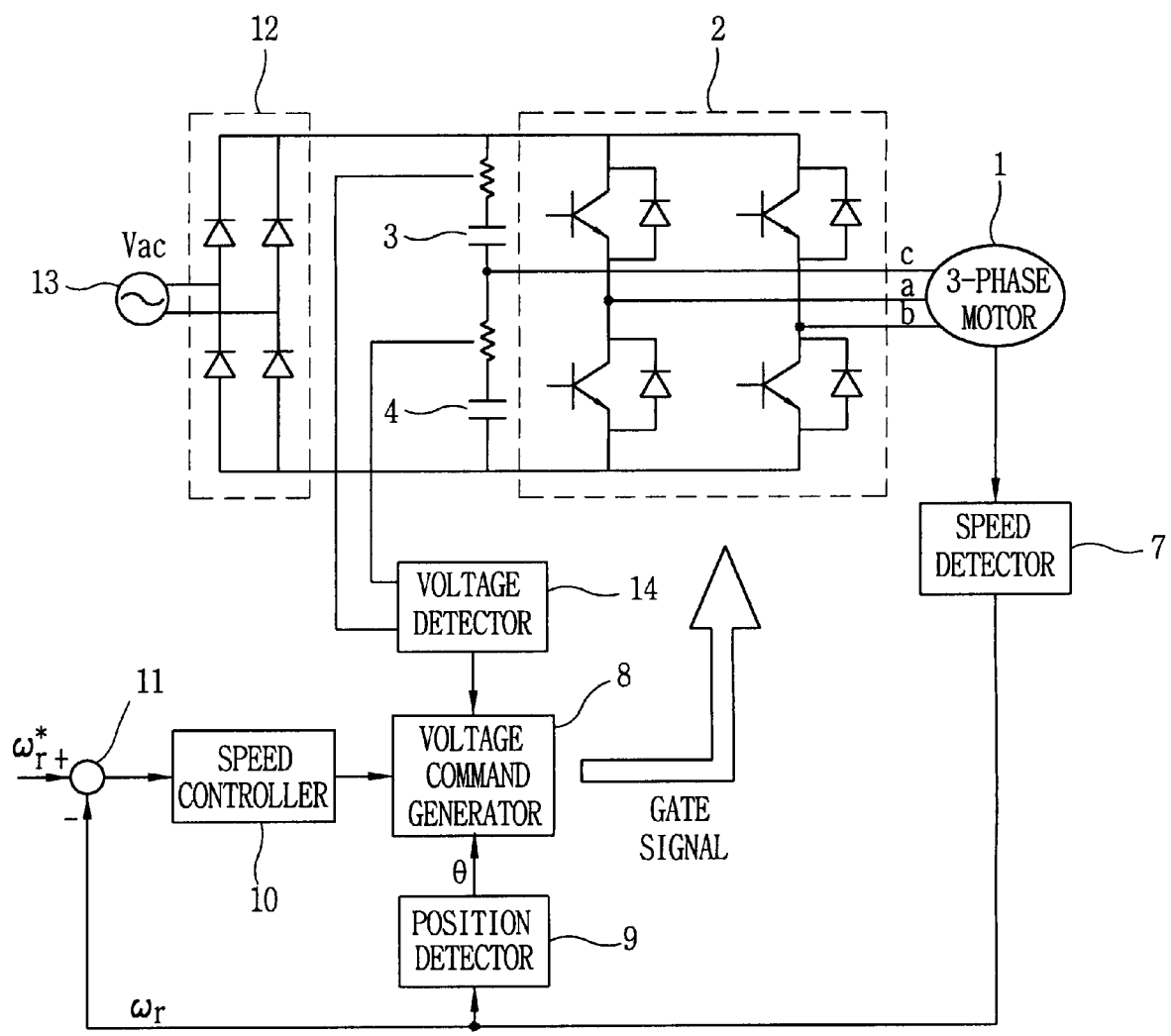
FIGS. 12A and 12B are circuit diagrams illustrating embodiments of the present invention associated with a phase distortion compensating apparatus for reducing a torque ripple in a 3-phase motor using four switching elements, respectively.
Figure 12B:
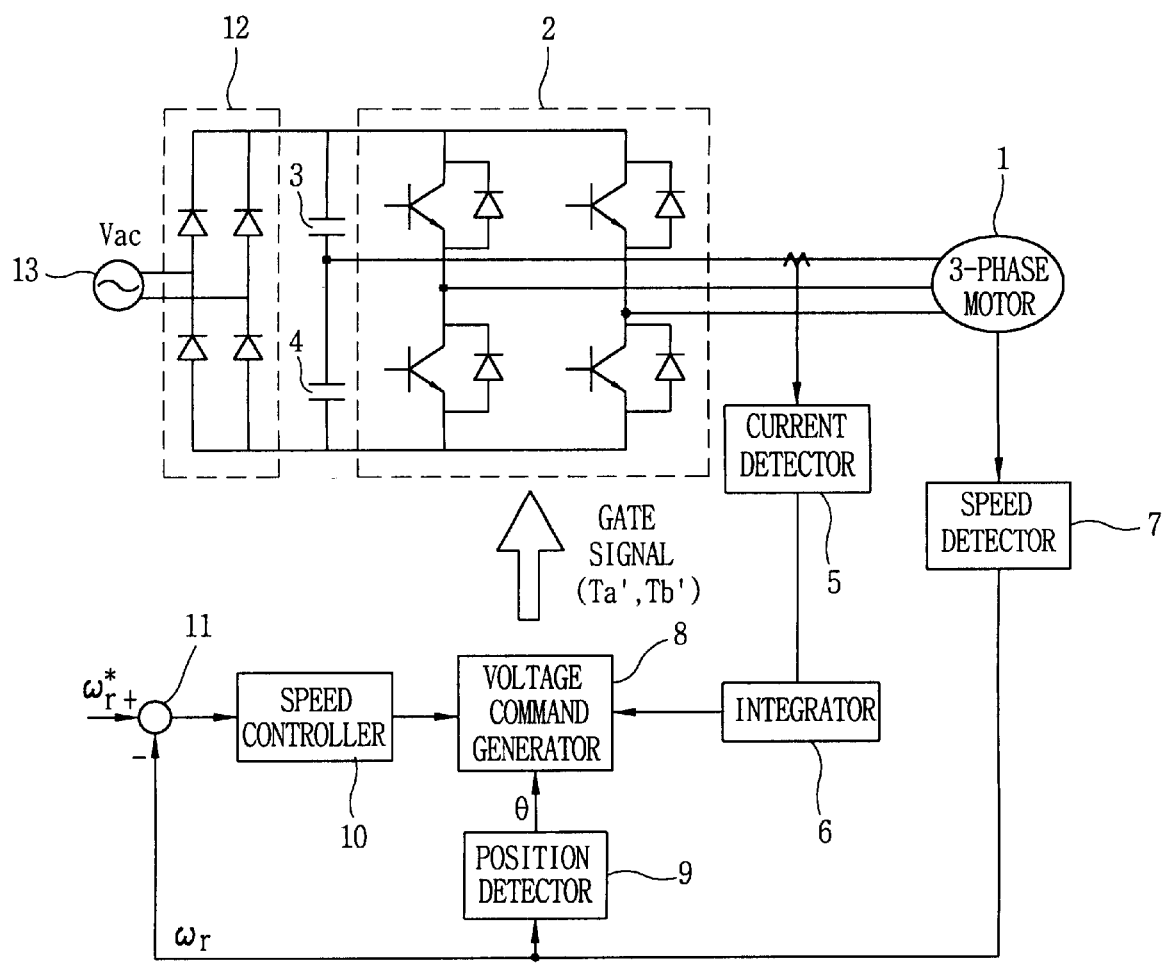

Referring to FIGS. 12A and 12B, embodiments of the present invention associated with a phase distortion compensating apparatus for reducing a torque ripple in a 3-phase motor using four switching elements are illustrated, respectively. In FIGS. 12A and 12B, elements respectively corresponding to those in FIG. 1 are denoted by the same reference numerals.

In accordance with either embodiment of the present invention, as shown in FIGS. 12A and 12B, the phase distortion compensating apparatus includes a rectifier unit 12 for rectifying an input AC voltage into a DC voltage using a bridge diode, upper and lower DC link capacitors 3 and 4 each adapted to conduct charge and discharge operations for the DC voltage, and an inverter 2 for receiving voltages respectively discharged from the capacitors 3 and 4, thereby generating 3-phase voltages, to be supplied to a 3-phase motor 1, by use of four switching elements. The apparatus also includes a speed detector 7 for detecting a rotating speed Wr of the 3-phase motor 1, a position detector 9 for detecting a rotor position θ of the 3-phase motor 1 based on the detected rotating speed Wr, a subtractor 11 for deriving an error of the detected rotating speed Wr from a command speed Wr*, a speed controller 10 for determining the level of a voltage to be applied to the 3-phase motor, based on the derived speed error, and a voltage command generator 8 for calculating compensation components for respective switching operations of the switching elements of A and B phases included in the inverter 2, based on a voltage difference between the capacitors 3 and 4 along with the voltage level determined by the speed controller 10, and providing respective switching times including the calculated compensation components, thereby controlling the rotating speed of the 3-phase motor.

In accordance with the embodiment illustrated in FIG. 12A, the voltage difference between the capacitors 3 and 4 is determined by a configuration including a current detector 5 for detecting current inputted to a connection node between the capacitors 3 and 4 connected to the 3-phase motor 1, and an integrator 6 for integrating the detected current, thereby deriving a voltage difference between the capacitors 3 and 4. In accordance with the embodiment illustrated in FIG. 12B, the voltage difference between the capacitors 3 and 4 is determined by a voltage detector 14 for detecting respective voltages across the capacitors 3 and 4, thereby deriving a difference between the detected voltages.

Now, the operation and effect of the apparatus having the above mentioned configuration will be described in detail.

As shown in FIGS. 12A and 12B, the inverter 2 used in accordance with the present invention is a B4 inverter including four switching elements to generate four voltage vectors.

That is, assuming that "S1" represents the switching status of an A-phase leg in the B4 inverter, and "S2" represents the switching status of a B-phase leg in the B4 inverter, four voltage vectors are generated from the B4 inverter because each of the switching statuses S1 and S2 is selected from two different switching statuses respectively corresponding to "0" and "1". Here, "0" means an ON state of the upper switching elements in the B4 inverter whereas "1" means an ON state of the lower switching elements.

Accordingly, such a B4 inverter has only four effective vectors to be applied to the motor.

FIGS. 3a to 3d illustrate different connections established between the 3-phase motor having a Y-configuration and the DC link in accordance with different switching statuses, respectively. In the cases respectively illustrated in FIGS. 3a to 3d, the C-phase of the 3-phase motor is coupled to the connection node of the upper and lower DC link capacitors 3 and 4. Also, "V1" represents the voltage across the upper DC link capacitor 3, and "V2" represents the voltage across the lower DC link capacitor 4.

Figure 3:
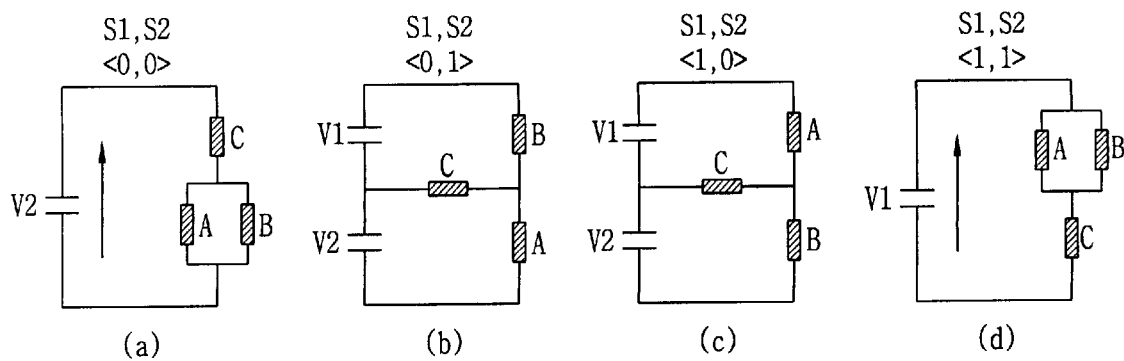
FIGS. 3a to 3d are circuit diagrams respectively illustrating different connections established between a Y-connection 3-phase motor and a DC link in accordance with different switching statuses, respectively.

FIG. 3a illustrates voltages applied to respective phases of the 3-phase motor when both the switching statuses S1 and S2 correspond to <0, 0>, that is, when only the lower switching elements are in an ON state while the upper switching elements are in an OFF state.

FIG. 3b illustrates voltages applied to respective phases of the 3-phase motor when both the switching statuses S1 and S2 correspond to <0, 1>, that is, when the switching status S1 of the A-phase leg corresponds to a status in which only the lower one of the associated switching elements is switched on whereas the switching status S2 of the B-phase leg corresponds to a status in which only the upper one of the associated switching elements is switched on.

FIG. 3c illustrates voltages applied to respective phases of the 3-phase motor when both the switching statuses S1 and S2 correspond to <1, 0>, that is, when the switching status S1 of the A-phase leg corresponds to a status in which only the upper one of the associated switching elements is switched on whereas the switching status S2 of the B-phase leg corresponds to a status in which only the lower one of the associated switching elements is switched on.

Also, FIG. 3d illustrates voltages applied to respective phases of the 3-phase motor when both the switching statuses S1 and S2 correspond to <1, 1>, that is, when only the lower switching elements are in an OFF state while the upper switching elements are in an ON state.

Voltage vectors generated in respective cases of FIGS. 3a to 3d having different switching statuses S1 and S2 can be depicted using an orthogonal coordinates system, as shown in FIG. 4. The orthogonal coordinates system has two orthogonal axes respectively representing real number components Re and imaginary number components Im of voltage vectors.

FIG. 5 is a table describing real number components Re and imaginary number components Im of the four voltages depicted in FIG. 4. In FIG. 5, "u" represents a voltage generated, and "t" represents a switching time.

Now, a voltage distortion phenomenon, which may occur in B4 inverters, will be described.

Where the voltage V1 across the upper DC link capacitor 3 and the voltage V2 across the lower DC link capacitor 4 supplied to the inverter 2, which is a B4 inverter, are ideal, that is, those voltages are equal (V1=V2), respective voltage vectors of four voltages generated from the B4 inverter may be orthogonal from one another, as shown in the left portion of FIG. 6. However, where the voltage V2 is higher than the voltage V1, the real number component Re (Re=½(V2−V1)) of the voltage u2(1, 0) or u4(0, 1) has a positive value, thereby resulting in a voltage vector biased in a right direction. Also, the voltage u1(0, 0) has an absolute value higher than that of the voltage u3(1, 1).

Figure 7:
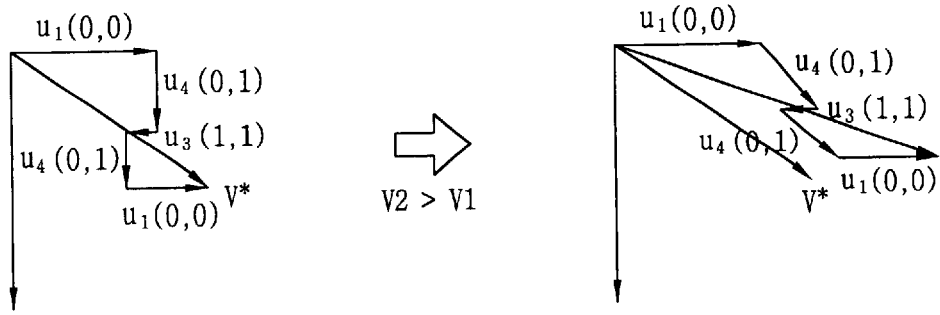
FIG. 7 is a diagram illustrating distortion of a really applied voltage in case that a voltage vector U2 and U1 is distorted because a voltage V2 is higher than a voltage V1.

As a result, a voltage vector distortion occurs due to the voltage difference between the upper and lower DC link capacitors 3 and 4, as shown in the right portion of FIG. 7, in spite of the switching time for each switching status S1 or S2 calculated to create voltage command vectors capable of generating a normal voltage command.

Of course, if there is no difference between the voltage across the upper DC link capacitor 3 and the voltage across the lower DC link capacitor 4, that is, when V1=V2, then a normal voltage command V* depicted in the left portion of FIG. 7 is generated.

To this end, it is necessary to compensate for the calculated switching time, so as to compensate for the voltage vector distortion resulting from the voltage difference.

In order to reduce the voltage vector distortion resulting from the voltage difference in the case of, for example, V2>V1, it is necessary to reduce the switching time t1 calculated for the voltage u1 while increasing the switching time t3 calculated for the voltage u3 because voltage vectors generated in the case of V2>V1 are biased in a right direction. In this case, the variation in switching time corresponds to the difference between V1 and V2 (that is, "V2−V1" or "V1−V2"). Also, it is necessary for the variation in switching time to be taken into consideration. This is because the voltage vector distortion is also proportional to the switching times t1 and t3, respectively.

In order to generate orthogonal voltage vectors as shown in FIG. 4, therefore, PWM pulses for switching on or off the switching elements of the inverter 2 are generated in a center-aligned fashion with respect to their ON times. These center-aligned PWM pulses are illustrated in FIGS. 8B and 9B, respectively.

Figure 8A:
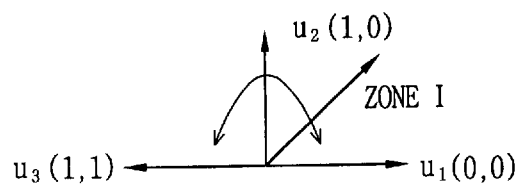
FIGS. 8A and 8B are diagrams respectively illustrating a command voltage vector located in a zone I where the switching time of an A-phase leg is more than the switching time of a B-phase leg, and the waveform of PWM pulses generating the command voltage vector.

FIG. 8A illustrates a command voltage vector located in a zone I influenced by voltages u1, u2, and u3 where the switching time Ta of the upper switch element of the A-phase leg is more than the switching time Tb of the upper switch element of the B-phase leg (Ta>Tb). FIG. 8B illustrates the waveform diagram of PWM pulses generating the command voltage vector of FIG. 8A.

If the calculated voltage is applied without any compensation therefor when the voltage V2 is higher than the voltage V1 in the case corresponding to the zone I of FIG. 8, then the voltage u1 is higher than an associated ideal voltage generated in the ideal case of V1=V2. In this case, the voltage u3 is less than an associated ideal voltage. In order to compensate for a voltage vector distortion resulting from the DC link voltage difference, therefore, it is necessary to reduce the switching time t1 for the voltage u1 while increasing the switching time t3 for the voltage u3.

Figure 8B:
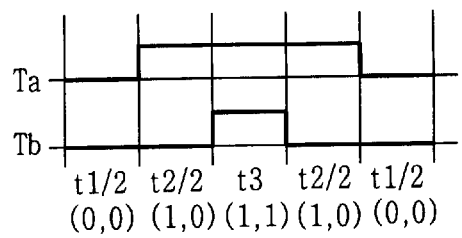

Assuming that "Tsamp" represents a switching sampling time in the case of FIG. 8B, the switching time t1 corresponds to Tsamp−Ta (t1=Tsamp−Ta) and the switching time t3 corresponds to Tb (t3=Tb). In the case of V2>V1, accordingly, the reduction of the switching time t1 and the increase of the switching time t3 for the voltage vector distortion resulting from the DC link voltage difference can be achieved by increasing both the switching times Ta and Tb from those of FIG. 8B.

Meanwhile, in the case of V1>V2 opposite to the case of V2>V1, it is necessary to increase the switching time t1 while reducing the switching time t3 in order to achieve a desired compensation. In this case, therefore, both the switching times Ta and Tb are reduced.

If the calculated voltage is applied without any compensation therefor when the voltage V2 is higher than the voltage V1 in the case corresponding to the zone II of FIG. 9, then the voltage u1 is higher than an associated ideal voltage. In this case, the voltage u3 is less than an associated ideal voltage. In order to compensate for a voltage vector distortion resulting from the DC link voltage difference, therefore, it is necessary to reduce the switching time t1 while increasing the switching time t3.

Assuming that "Tsamp" represents a switching sampling time in the case of FIG. 9B, the switching time t1 corresponds to Tsamp−Ta (t1=Tsamp−Ta) and the switching time t3 corresponds to Tb (t3=Tb). In the case of V2>V1, accordingly, the reduction of the switching time t1 and the increase of the switching time t3 for the voltage vector distortion resulting from the DC link voltage difference can be achieved by increasing both the switching times Ta and Tb from those of FIG. 8B.

Meanwhile, in the case of V1>V2 opposite to the case of V2>V1, it is necessary to increase the switching time t1 while reducing the switching time t3 in order to achieve a desired compensation. In this case, therefore, both the switching times Ta and Tb are reduced.

As apparent from the above description, the compensation for the switching times t1 and t3 is carried out irrespective of the zone where the command voltage vector is located. That is, both the switching times Ta and Tb are increased when the voltage V2 is higher than the voltage V1 while being reduced when the voltage V2 is lower than the voltage V1.

The detection of the voltage difference between the upper and lower DC link capacitors 3 and 4 in accordance with the present invention will be described in conjunction with the embodiment of FIG. 12B in which the voltage difference is detected, based on the detection of current.

Figures 10, 11:
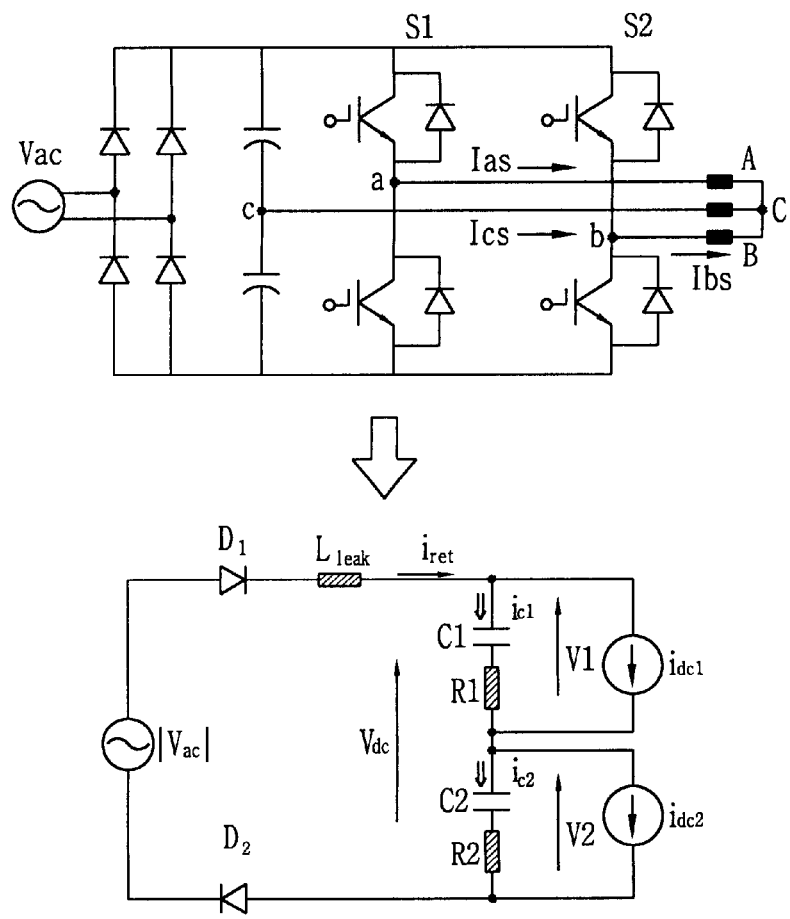
FIG. 10 is an equivalent circuit diagram of an inverter including upper and lower DC link capacitors.
FIG. 11 is a table describing a variation in the current inputted to a connection node between the upper and lower DC link capacitors in accordance with different switching statuses under the condition in which the C-phase of a 3-phase motor is connected to a connection node between the upper and lower DC link capacitors.

The rectifier unit 12, the upper and lower DC link capacitors 3 and 4, and the inverter 2 in FIG. 12B can compose an equivalent circuit as shown in FIG. 10. Where the equivalent circuit has a connection configuration in which the C-phase is coupled to the connection node, the flow of current depending on the switching operation of the inverter 2 is illustrated in FIG. 11.

The equivalent circuit of FIG. 10 can be expressed by the following Equation 2:

$$L_{leak} \frac{d|i_{ret}|}{dt} = |Vac| - Vdc - 2 \cdot V_D \quad (2)$$

$$i_{ret} = i_{c1} + i_{dc1}, i_{c2} + i_{dc2}$$

$$V2 = \frac{1}{C2} \int i_{c2} dt + R2 \cdot i_{c2}$$

$$V1 = \frac{1}{C2} \int i_{c1} dt + R1 \cdot i_{c1}$$

$$V_{dc} = V1 + V2$$

where, $L_{leak}$ represents a leakage inductance component, C1 and C2 represent respective capacitances of the upper and lower DC link capacitors 3 and 4, and R1 and R2 represent respective DC equivalent resistances of the capacitors 3 and 4.

The voltage difference between the upper and lower DC link capacitors 3 and 4, "V2−V1", in the circuit of FIG. 10 can be expressed by the following Equation 3:

$$V2 - V1 = \left(\frac{1}{C2}\int i_{c2} dt + R2 \cdot i_{c2}\right) - \left(\frac{1}{C1}\int i_{c1} dt + R1 \cdot i_{c1}\right) \quad (3)$$

Where the upper and lower DC capacitors 3 and 4 have the same capacitance (C=C1=C2), and the voltage drop resulting from the resistors R1 and R2 is neglected in Equation 3, the following Equation 4 can be established:

$$V2 - V1 = \frac{1}{C}\int (i_{c2} - i_{c1}) dt = \frac{1}{C1}\int (i_{dc1} - i_{dc2}) dt \quad (4)$$

In Equation 4, "$i_{dc1}-i_{dc2}$" represents the amount of current inputted to the connection node between the upper and lower DC link capacitors 3 and 4. Referring to FIG. 11, it can be found that the current "$i_{dc1}-i_{dc2}$" always corresponds to "$-i_{cs}$" irrespective of the switching status of the inverter 2.

Accordingly, the difference the voltage V1 across the upper DC link capacitor 3 and the voltage V2 across the lower DC link capacitor 4 can be expressed by the following Equation 5:

$$V2 - V1 = \frac{1}{C}\int (-i_{cs}) \quad (5)$$

Referring to Equation 5, it can be found that the difference the voltages V1 and V2 corresponds to the integral value of the current inputted to the connection node between the upper and lower DC link capacitors. As mentioned above, this voltage difference can be detected using a current detector and an integrator without a direct detection thereof. Thus, the voltage difference may be directly or indirectly detected.

Meanwhile, the compensation amount is determined, based on the difference between the voltages V1 and V2, that is, "V2−V1" or "V1−V2". This compensation amount is proportional to the distortion degree of the switching time t1 for the voltage vector u1 and the distortion degree of the switching time t3 for the voltage vector u3.

The compensation amount in the zone I of FIG. 8A can be expressed by the following Equation 6:

$$\Delta Ta = k^*(V2-V1)^*t1$$

$$\Delta Tb = k^*(V2-V1)^*t3 \quad (6)$$

where, k represents a compensation constant.

Referring to Equation 6, it can be found that compensation amounts ΔTa and ΔTb for respective switching times t1 and t3 are increased in the case of V2>V1 while being decreased in the case of V1>V2.

Figure 9A:
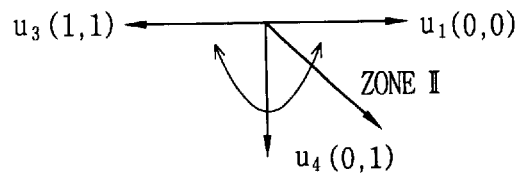
FIGS. 9A and 9B are diagrams respectively illustrating a command voltage vector located in a zone II where the switching time of the B-phase leg is more than the switching time of the A-phase leg, and the waveform of PWM pulses generating the command voltage vector.
Figure 9B:
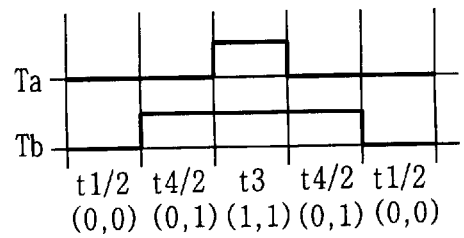

On the other hand, the compensation amount in the zone II of FIG. 9A can be expressed by the following Equation 7:

$$\Delta Ta = k^*(V2-V1)^*t3$$

$$\Delta Tb = k^*(V2-V1)^*t1 \quad (7)$$

where, k represents a compensation constant.

Referring to Equations 6 and 7, it can be found that the variation in the switching time Ta depends on the variation in the switching time t1, and the variation in the switching time Tb depends on the variation in the switching time t3.

Now, the procedure for compensating for switching times in the above mentioned fashion will be described, in conjunction with FIG. 12B and FIG. 13.

In the circuit of FIG. 12B, its rectifier unit 12 rectifies an input AC voltage into a DC voltage by use of the bridge diode, and then applies the DC voltage to the upper and lower DC link capacitors 3 and 4 which are, in turn, charged with the DC voltage.

When the charged voltage is supplied to the switching elements of the inverter 2, those switching elements conduct switching operations thereof to rotate the 3-phase AC motor 1.

During the rotation of the 3-phase AC motor 1, the speed detector 7 detects the rotating speed Wr of the motor 1, and supplies the detected rotating speed to the subtractor 11 and the position detector 9.

The position detector 9 derives the rotor position θ of the motor 1, based on the detected rotating speed, and supplies the detected rotor position θ to the voltage command generator 8.

Based on the detected rotor position θ, the voltage command generator 8 derives the switching times Ta and Tb for respective upper switches of the A and B-phase legs in the inverter 2 as follows (Step S100 of FIG. 13):

$$Ta = \left[\frac{1}{2} + \frac{1}{2} * ma * \sin\left(\theta - \frac{\pi}{6}\right)\right] * Tsamp$$

$$Tb = \left[\frac{1}{2} + \frac{1}{2} * ma * \sin\left(\theta - \frac{\pi}{2}\right)\right] * Tsamp$$

where, "ma" represents a modulation rate, and "Tsamp" represents a sampling time.

Figure 13:
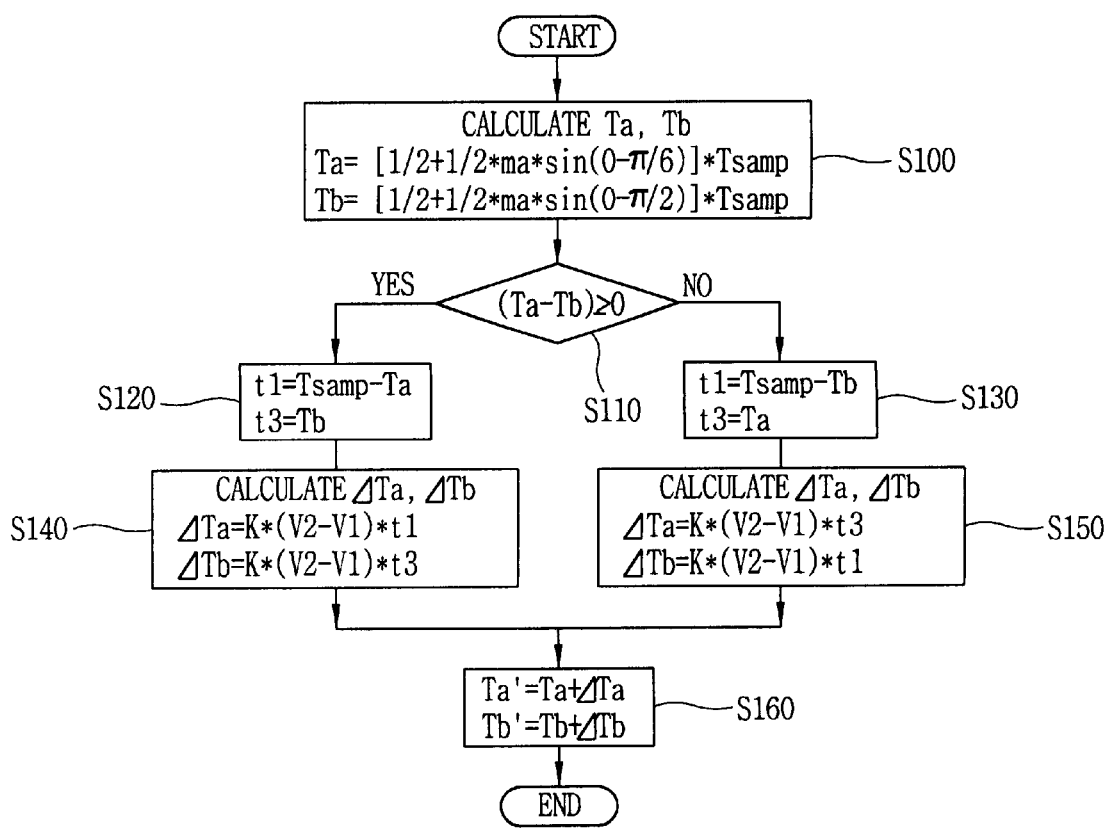
FIG. 13 is a flow chart illustrating a phase distortion compensating method for reducing a torque ripple in a 3-phase motor using four switching elements.

Thereafter, the derived switching time Ta of the A-phase leg is compared with the derived switching time Tb of the B-phase leg (Step S110 of FIG. 13).

Where it is determined that the switching time Ta of the A-phase leg is more than the switching time Tb of the B-phase leg, the switching time t1 of the voltage vector u1(0, 0) and the switching time t3 of the voltage vector u3(1, 1) are derived using "t1=Tsamp−Ta" and "t3=Tb" (Step S120 of FIG. 13). On the other hand, where the switching time Tb of the B-phase leg is more than the switching time Ta of the A-phase leg, the switching time t1 of the voltage vector u1(0, 0) and the switching time t3 of the voltage vector u3(1, 1) are derived using "t1=Tsamp−Tb" and "t3=Tb" (Step S130 of FIG. 13).

Based on the derived switching times Ta and Tb, the voltage command generator 8 generates a speed command Wr* to control the speed of the 3-phase AC motor 1. This speed command Wr* is applied to the subtractor 11 which, in turn, subtracts the speed of the 3-phase AC motor 1 detected by the speed detector 7 from the speed command Wr*, thereby deriving an error of the detected rotating speed Wr from the speed command Wr. This derived speed error is supplied to the speed controller 10.

Based on the speed error, the speed controller 10 generates a command indicative of the level of a voltage to be applied to the 3-phase motor, and applies this command to the voltage command generator 8.

At this time, the current detector 5 detects a current flowing from the connection node between the upper and lower DC link capacitors 3 and 4 toward the 3-phase motor 1, and transmits the detected current to the integrator 6. The integrator 6 integrates the detected current, thereby calculating a corresponding voltage which is, in turn applied to the voltage command generator 8.

The voltage obtained by the current integration corresponds to the difference between the voltage V2 across the lower DC link capacitor 4 and the voltage V1 across the upper DC link capacitor 3.

In place of using the current detector and integrator, the voltage difference at the connection node may be derived using the voltage detector 14 which directly detects the voltage V1 across the upper DC link capacitor 3 and the voltage V2 across the lower DC link capacitor 4, as shown in FIG. 12A. The derived voltage difference is supplied to the voltage command generator 8.

Thereafter, the voltage command generator 8 calculates compensation components ΔTa and ΔTb for switching times, based on the command voltage derived by the speed controller 10, the rotor position θ detected by the position detector 9, and the voltage difference detected by the voltage detector 14 or the current detector 5 and integrator 6 (Steps S140 and S150 of FIG. 13).

The derived compensation components ΔTa and ΔTb are added to the switching time Ta and Tb for the A and B-phase legs calculated at step S100, thereby deriving new switching times Ta' and Tb' reflecting those compensation components ΔTa and ΔTb, respectively, as follows (Step S160 of FIG. 13):

$$Ta'=Ta+\Delta Ta$$

$$Tb'=Tb+\Delta Tb$$

The switching times Ta' and Tb' are applied to the inverter 2, as a gate signal. Based on this gate signal, each switching element of the inverter 2 is switched on or off in accordance with an associated one of the applied switching 1 times, thereby applying a 3-phase voltage to the 3-phase AC motor 1. Thus, the 3-phase AC motor 1 is rotated.

Figure 14A:
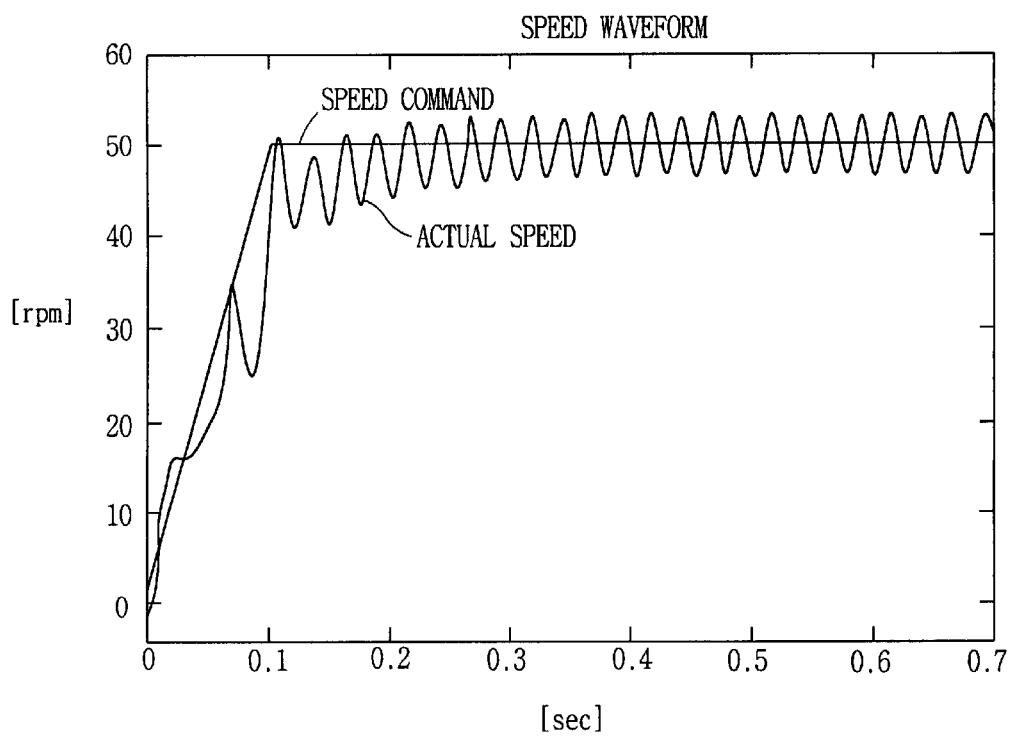
FIG. 14A is a waveform diagram illustrating a speed command for rotating the 3-phase motor where no compensation for a voltage distortion is made, and an actual speed of the 3-phase AC motor based on the speed command.
Figure 14B:
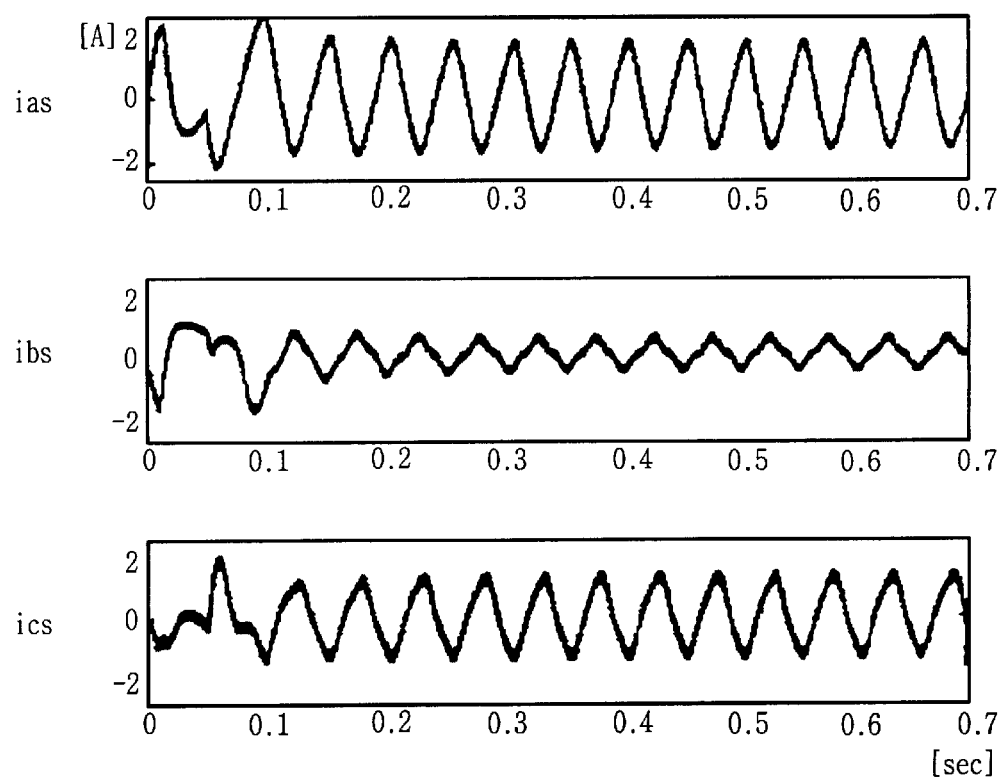
FIG. 14B is a waveform diagram illustrating 3-phase currents generated in the case of FIG. 14A.

FIG. 14A illustrates the speed command for rotating the 3-phase AC motor 1 where no compensation for switching times is made, and the actual speed of the 3-phase AC motor 1 based on this command. FIG. 14B illustrates 3-phase currents generated in the case of FIG. 14A.

Referring to FIG. 14A, it can be found that there is a considerable speed ripple in association with a speed command of 50 rpm. Referring to FIG. 14B, it can be found that the B-phase current ibs is less than the A-phase current ias and the C-phase current ics, in spite of the fact that a balanced 3-phased voltage results in balanced 3-phase currents having a phase difference of 120°. It can also be found that the B and C-phases are substantially similar to each other.

This is because the application voltage vector of the B4 inverter is considerably distorted from the command voltage vector due to the difference between the voltage across the upper DC link capacitor and the voltage across the lower DC link capacitor, so that it is impossible to apply a balanced 3-phase voltage. Due to such a voltage distortion, the torque generated from the motor ripples. As a result, a speed ripple occurs in the motor.

Figure 15A:
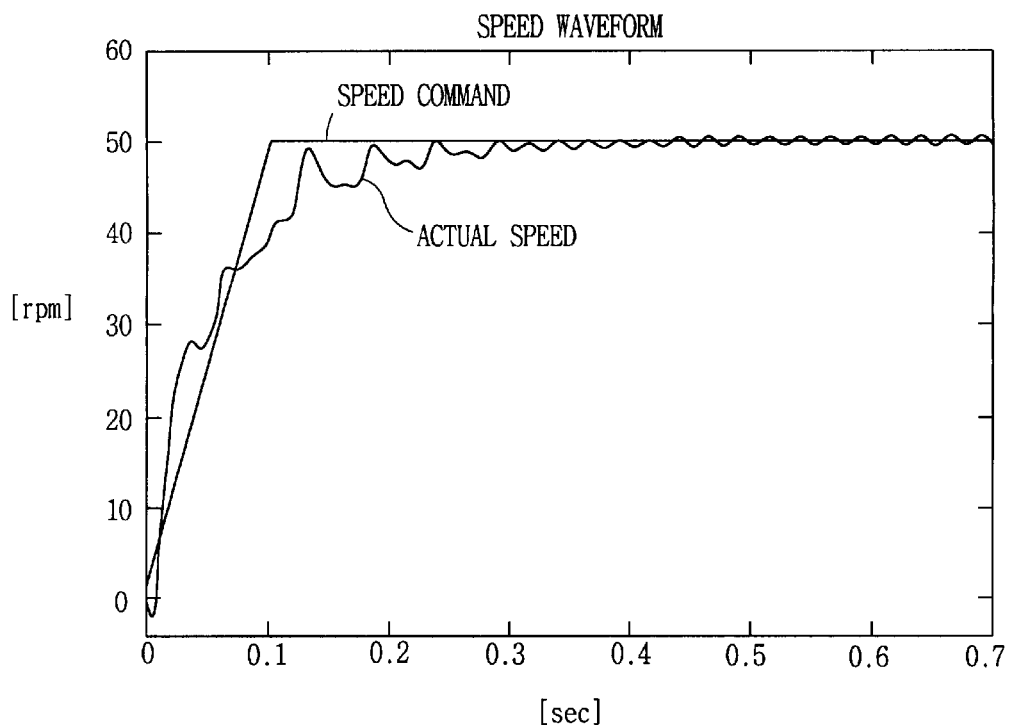
FIG. 15A is a waveform diagram illustrating a speed command for rotating the 3-phase motor where a compensation for a voltage distortion is made, and an actual speed of the 3-phase AC motor based on the speed command.
Figure 15B:
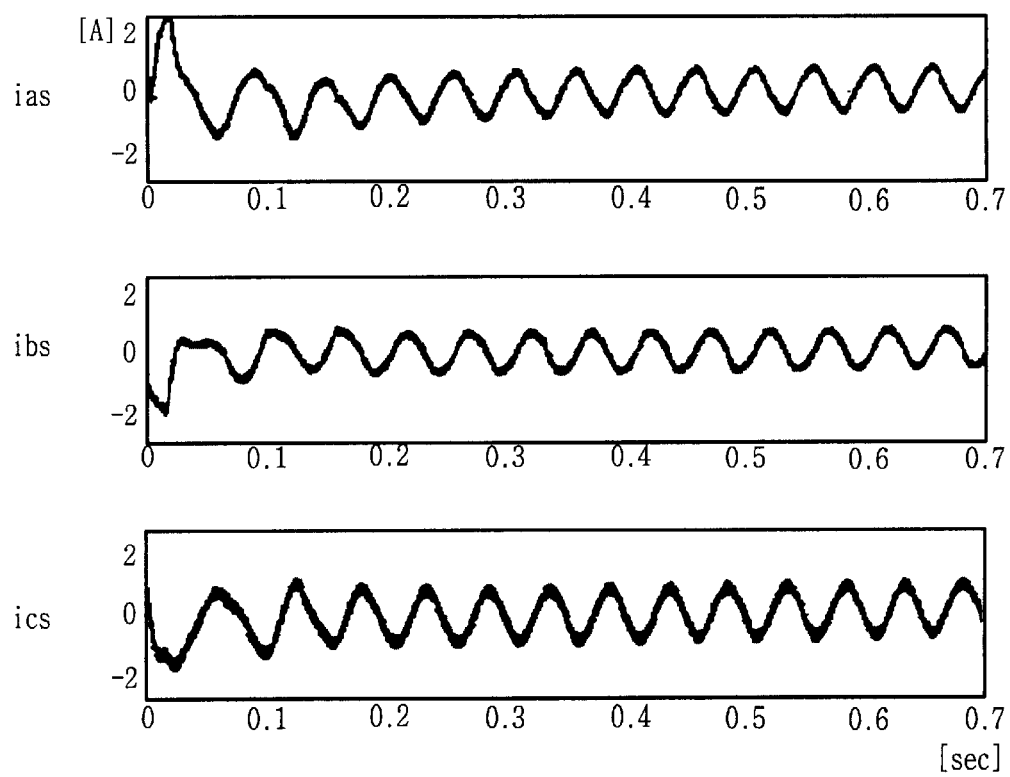
FIG. 15B is a waveform diagram illustrating 3-phase currents generated in the case of FIG. 15A.
Figure 15C:
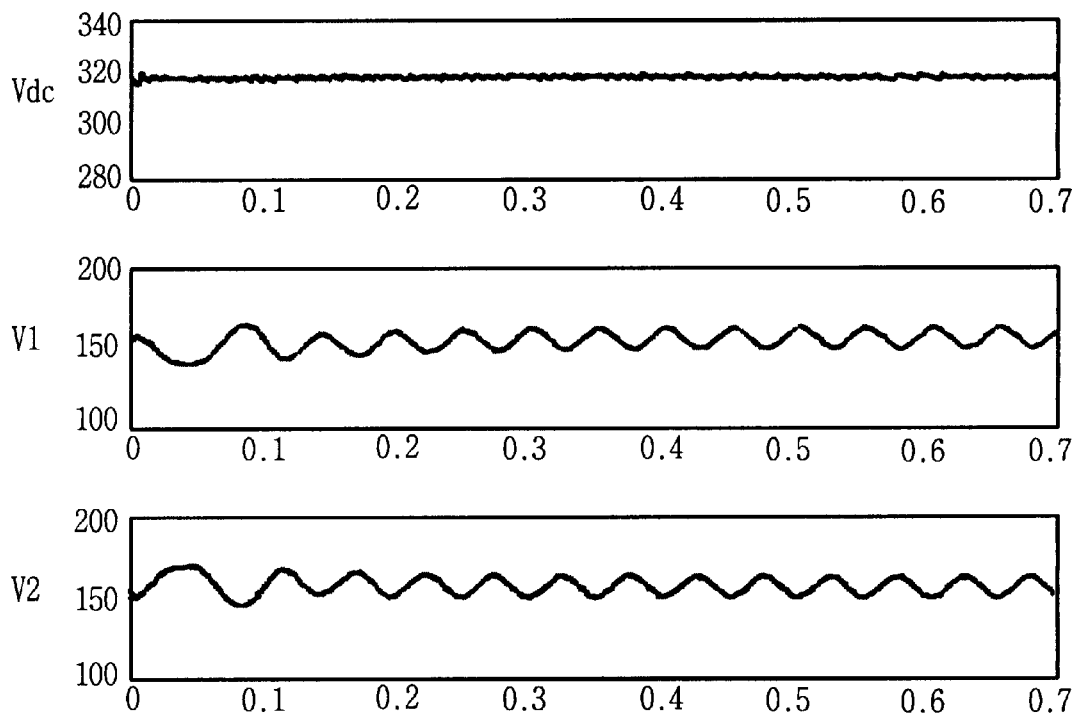
FIG. 15C is a waveform diagram illustrating a DC link voltage along with a voltage across the upper DC link capacitor and a voltage across the lower DC link capacitor.

However, where a compensation for switching times is made under the same condition as that of FIG. 14A in accordance with the present invention, a reduction in speed ripple is achieved. This can be seen by comparing the speed command and the actual speed, shown in FIG. 15A, with each other. Referring to FIG. 15B, the phases of the 3-phase currents ias, ibs, and ics are maintained to have 120°. Referring to FIG. 15C, it can be found that the DC link voltage vdc is distributed to the upper and lower DC link capacitors so as to charge those capacitors with voltages V1 and V2 and to discharge the charged voltages V1 and V2 from the capacitors, respectively.

Where the present invention is applied to a permanent magnet synchronous motor (PMSM), the voltage difference at the connection node between the upper and lower DC link capacitors may be derived only using a current detecting method, in place of the above mentioned method in which the current detector and integrator are used.

In the case of such a PMSM, its motor speed is controlled by allowing an induced voltage and a phase current to coincide with each other. Accordingly, if the rotor position of the motor is known, and it is assumed that the current inputted to the connection node between the upper and lower DC link capacitors has a C-phase, then the C-phase current ics can be expressed as follows:

$$V2 - V1 = -\frac{1}{C}\int i_{cs}dt \quad i_{cs} = I\cdot\sin\left(\omega t + \frac{2\pi}{3}\right)$$

$$-\frac{1}{C}\int i_{cs}dt = -\frac{1}{C}\int I\cdot\sin\left(\omega t + \frac{2\pi}{3}\right)dt = \frac{1}{C\cdot\omega}I\cdot\cos\left(\omega t + \frac{2\pi}{3}\right)$$

Figure 16:
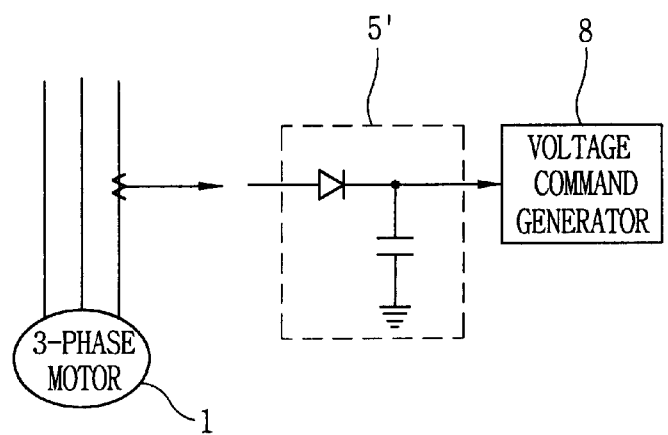
FIG. 16 is a circuit diagram illustrating a current detector consisting of a diode and a capacitor, which is used in place of a combination of a current detector and an integrator, in accordance with another embodiment of the present invention.

In place of using the current detector 5 and integrator 6 shown in FIG. 12B, accordingly, the voltage difference at the connection node between the upper and lower DC link capacitors can be derived by detecting the current inputted to the connection node using a current detector 5' consisting of a diode and a capacitor, as shown in FIG. 16, and conducting a trigonometric function operation for the detected current along with the speed and rotor position of the motor previously detected.

As apparent from the above description, in accordance with the present invention, respective switching times of phase voltages, to be supplied to the 3-phase motor, are adjusted, based on the voltage difference between upper and lower DC link capacitors, to reduce a torque ripple generated in the 3-phase motor, thereby achieving a reliable speed control.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A phase distortion compensating apparatus for reducing a torque ripple in a 3-phase motor, comprising:

a rectifier unit for rectifying an input AC voltage into a DC voltage;

upper and lower DC link capacitors connected in parallel to the rectifier unit, each of the DC link capacitors serving to conduct charge and discharge operations for the DC voltage;

an inverter connected in parallel to the capacitors and adapted to generate a 3-phase voltage adapted to rotate the 3-phase motor, based on voltages respectively discharged from the capacitors along with a switching signal, and a voltage command generator for calculating compensation components for respective switching operations of switching elements included in the inverter, which are connected to A and B phases of the motor, based on a voltage difference between the capacitors, a difference between an actual rotating speed of the motor and a command speed, and a rotor position of the motor, and providing respective switching times including the calculated compensation components, thereby controlling a rotating speed of the motor, wherein an operational one phase of the 3-phase motor is connected to a connection node between the upper and lower DC link capacitors.

2. The phase distortion compensating apparatus according to claim 1, further comprising:

a speed detector coupled to the motor and adapted to detect the rotating speed of the motor;

a position detector coupled to the speed detector and adapted to detect the rotor position of the motor based on the detected rotating speed;

a subtractor coupled to the position detector and the speed detector and adapted to derive an error of the detected rotating speed from the command speed;

a speed controller coupled to an output of the subtractor and adapted to determine the level of a voltage to be supplied to the motor, based on the derived speed error; and a voltage detector adapted to derive the voltage difference between the upper and lower DC link capacitors.

3. The phase distortion compensating apparatus according to claim 2, further comprising, in place of the voltage detector:

a current detector for detecting a current inputted to a connection node between the upper and lower DC link capacitors to which an optional one phase of the 3-phase motor is connected; and an integrator for integrating the detected current, thereby indirectly deriving the voltage difference between the capacitors.

4. A phase distortion compensating apparatus for reducing a torque ripple in a 3-phase motor, comprising:

a rectifier unit for rectifying an input AC voltage into a DC voltage;

upper and lower DC link capacitors connected in parallel to the rectifier unit, each of the DC link capacitors serving to conduct charge and discharge operations for the DC voltage;

an inverter connected in parallel to the capacitors and adapted to generate a 3-phase voltage adapted to rotate the 3-phase motor, based on voltages respectively discharged from the capacitors along with a switching signal;

a voltage command generator for calculating compensation components for respective switching operations of switching elements included in the inverter, which are connected to A and B phases of the motor, based on a voltage difference between the capacitors, a difference between an actual rotating speed of the motor and a command speed, and a rotor position of the motor, and providing respective switching times including the calculated compensation components, thereby controlling a rotating speed of the motor, wherein the voltage command generator calculates the compensation components for respective switching operations of the switching elements of A and B phases, based on the voltage difference derived by the integrator, the rotor position detected by the position detector, and the voltage level determined by the speed controller;

a speed detector coupled to the motor and adapted to detect the rotating speed of the motor;

a position detector coupled to the speed detector and adapted to detect the rotor position of the motor based on the detected rotating speed;

a subtractor coupled to the position detector and the speed detector and adapted to derive an error of the detected rotating speed from the command speed;

a speed controller coupled to an output of the subtractor to determine the level of a voltage to be supplied to the motor, based on the derived speed error;

a current detector for detecting a current input to a connection node between the upper and lower DC link capacitors to which an optional one phase of the 3-phase motor is connected; and an integrator for integrating the detected current, thereby indirectly deriving the voltage difference between the capacitors.

5. The phase distortion compensating apparatus for reducing a torque ripple in a 3-phase motor, comprising:

a rectifier unit for rectifying an input AC voltage into a DC voltage;

upper and lower DC link capacitors connected in parallel to the rectifier unit, each of the DC link capacitors serving to conduct charge and discharge operations for the DC voltage;

an inverter connected in parallel to the capacitors and adapted to generate a 3-phase voltage adapted to rotate the 3-phase motor, based on voltages respectively discharged from the capacitors along with a switching signal;

a voltage command generator for calculating compensation components for respective switching operations of switching elements included in the inverter, which are connected to A and B phases of the motor, based on a voltage difference between the capacitors, a difference between an actual rotating speed of the motor and a command speed, and a rotor position of the motor, and providing respective switching times including the calculated compensation components, thereby controlling a rotating speed of the motor; and a speed detector coupled to the motor and adapted to detect the rotating speed of the motor;

a position detector coupled to the speed detector and adapted to detect the rotor position of the motor based on the detected rotating speed;

a subtractor coupled to the position detector and the speed detector and adapted to derive an error of the detected rotating speed from the command speed;

a speed controller coupled to an output of the subtractor to determine the level of a voltage to be supplied to the motor, based on the derived speed error; and a current detector comprising a diode and a capacitor and serving to detect a current inputted to the connection node.

6. A phase distortion compensating method for reducing a torque ripple in a 3-phase motor, comprising the steps of:

(a) calculating respective switching times (Ta and Tb) for upper ones of four switching elements respectively associated with A- and B-phase legs in an inverter, the A- and B-phase legs being connected to A and B phases of the motor, respectively, based on a voltage command for driving the 3-phase motor;

(b) comparing the calculated switching times (Ta and Tb) with each other;

(c) calculating on-time t1 of lower switch in the A- and B-phase legs switching status from the Ta and Tb and on-time t2 of upper switch in the A- and B-phase legs switching status from the Ta and Tb;

(d) detecting a current inputted to a connection node between upper and lower DC link capacitors respectively connected to the A- and B-phase legs of the inverter after completion of the calculation of the switching times (t3 and t3), and integrating the detected current, thereby deriving a difference between a voltage across the upper DC link capacitor and a voltage across the lower DC link capacitor;

(e) calculating respective compensation components ($\Delta Ta$ and $\Delta Tb$) for the switching times (Ta and Tb), based on the derived voltage difference; and (f) producing new switching times (Ta' and Tb') respectively reflecting the calculated compensation components, and supplying the new switching times to the inverter.

7. The phase distortion compensating method according to claim 6, wherein the switching times (Ta and Tb) are increased when the voltage (V2) across the lower DC link capacitor is more than the voltage (V1) across the upper DC link capacitor while being decreased when the voltage (V1) across the upper DC link capacitor is more than the voltage (V2) across the lower DC link capacitor.

8. The phase distortion compensating method according to claim 6, wherein the calculation of the switching times (Ta and Tb) at the step (a) is carried out using the following equations:

$$Ta = \left[\frac{1}{2} + \frac{1}{2} * ma * \sin\left(\theta - \frac{\pi}{6}\right)\right] * Tsamp$$

$$Tb = \left[\frac{1}{2} + \frac{1}{2} * ma * \sin\left(\theta - \frac{\pi}{2}\right)\right] * Tsamp$$

where, "ma" represents a modulation rate, and "Tsamp" represents a sampling time.

9. The phase distortion compensating method according to claim 6, wherein the calculation of On times (t1 and t3) at the step (c) is carried out using the following equations If $Ta \geq Tb$, $t1 = Tsamp - Ta$, $t3 = Ta$ If $Ta < Tb$, $t1 = Tsamp - Tb$, $t3 = Ta$ where, "Tsamp" represents a sampling time.

10. The phase distortion compensating method according to claim 6, wherein the calculation of the compensating components ($\Delta Ta$ and $\Delta Tb$) for the switching times (Ta and Tb) at the step (e) is carried out using the following equations:

If $Ta \geq Tb$, $\Delta Ta = k*(V2-V1)*t1$, $\Delta Tb = k*(V2-V1)*t3$

If $Ta < Tb$, $\Delta Ta = k*(V2-V1)*t3$, $\Delta Tb = k*(V2-V1)*t1$.

11. The phase distortion compensating method according to claim 6, wherein the calculation of the new switching times (Ta' and Tb') at the step (f) is carried out using the following equation:

$Ta' = Ta + Ta$ $Tb' = Tb + Tb$.

* * * * *